(12) United States Patent
Kahle et al.

(10) Patent No.: US 11,181,991 B2
(45) Date of Patent: Nov. 23, 2021

(54) SYSTEM AND METHOD FOR MEASURING POSITION AND ORIENTATION OF A RIGID BODY

(71) Applicant: Hilti Aktiengesellschaft, Schaan (LI)

(72) Inventors: Kent Kahle, Hayward, CA (US);
Sascha Korl, Buchs (CH); Andreas Winter, Feldkirch (AT); Scott Graybill, Arvada, CO (US)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/625,038

(22) PCT Filed: Jun. 29, 2018

(86) PCT No.: PCT/EP2018/067588
§ 371 (c)(1),
(2) Date: Dec. 20, 2019

(87) PCT Pub. No.: WO2019/002554
PCT Pub. Date: Jan. 3, 2019

(65) Prior Publication Data
US 2020/0218366 A1 Jul. 9, 2020

Related U.S. Application Data (63) Continuation of application No. 15/638,815, filed on Jun. 30, 2017, now abandoned.

(51) Int. Cl.
*G06F 3/0346* (2013.01)
*G01C 15/08* (2006.01)
(Continued)

(52) U.S. Cl.
CPC ........... *G06F 3/0346* (2013.01); *G01C 15/08* (2013.01); *G01S 5/163* (2013.01); *G01S 17/42* (2013.01);
(Continued)

(58) Field of Classification Search
CPC ... G06F 3/0346; G06F 3/00325; G01C 15/08; G01S 5/163; G01S 17/42; G01S 17/66; G01S 17/74; G01S 17/875
See application file for complete search history.

(56) References Cited

U.S. PATENT DOCUMENTS 6,727,849 B1 * 4/2004 Kirk ...................... G01C 15/00
342/357.52
7,990,550 B2 8/2011 Aebischer et al.
(Continued)

FOREIGN PATENT DOCUMENTS

EP 1 703 300 A1 9/2006
EP 2 344 303 B1 7/2011
(Continued)

OTHER PUBLICATIONS

PCT/EP2018/067588, International Search Report dated Nov. 21, 2018 (Four (4) pages).

*Primary Examiner* — Raymond L Nimox
(74) *Attorney, Agent, or Firm* — Crowell & Moring LLP (57) ABSTRACT

A system and method for determining a position and orientation (e.g., pose) of a rigid body. The rigid body may be a position enabled projector, a surveying rod, a power tool, a drill robot, etc., in a given space. The position of the rigid body is specified by a set of three coordinates and the orientation is specified by a set of three angles. As such, based on these six values, the position and orientation of the rigid body can be determined.

20 Claims, 4 Drawing Sheets

(51) Int. Cl.
*G01S 17/42* (2006.01)
*G01S 17/66* (2006.01)
*G01S 5/16* (2006.01)
*G01S 17/74* (2006.01)
*G01S 17/875* (2020.01)
*G06F 3/03* (2006.01)

(52) U.S. Cl.
CPC .............. *G01S 17/66* (2013.01); *G01S 17/74* (2013.01); *G01S 17/875* (2013.01); *G06F 3/0325* (2013.01)

(56) References Cited

U.S. PATENT DOCUMENTS

| | | | |
|---|---|---|---|
| 8,516,711 B2 | 8/2013 | Pettersson | |
| 9,377,301 B2 | 6/2016 | Neier et al. | |
| 9,561,019 B2 * | 2/2017 | Mihailescu | A61B 90/361 |
| 9,858,712 B2 * | 1/2018 | Stathis | G06T 17/20 |
| 9,879,993 B2 * | 1/2018 | McFadden | G01C 11/04 |
| 10,168,153 B2 * | 1/2019 | Grasser | G01C 15/06 |
| 2009/0231582 A1 | 9/2009 | Aebischer et al. | |
| 2011/0173829 A1 | 7/2011 | Pettersson | |
| 2012/0166137 A1 * | 6/2012 | Grasser | G01C 15/002 |
| | | | 702/150 |
| 2014/0247439 A1 * | 9/2014 | Neier | G01S 17/87 |
| | | | 356/4.01 |
| 2015/0253124 A1 * | 9/2015 | Steffey | G01B 11/002 |
| | | | 356/614 |
| 2016/0349746 A1 * | 12/2016 | Grau | G05D 1/0094 |
| 2017/0082748 A1 * | 3/2017 | Nishita | G01S 17/86 |

FOREIGN PATENT DOCUMENTS

| | | |
|---|---|---|
| EP | 2 765 388 A1 | 8/2014 |
| EP | 3 144 714 A2 | 3/2017 |

\* cited by examiner

SYSTEM AND METHOD FOR MEASURING POSITION AND ORIENTATION OF A RIGID BODY

BACKGROUND OF THE INVENTION

Building information modeling (BIM) is a process that involves generating and managing one or more digital representations of the physical and functional characteristics of a place and/or structure. Building information models (BIMs) are computer-executable files that may be extracted, exchanged, and networked to facilitate the construction or renovation of the place and/or structure associated with the model. BIMs may be used by individuals, private entities, and government agencies that plan, design, construct, operate, or maintain various physical infrastructures, such as buildings, water, electricity, communication utilities, roads, bridges, and tunnels.

BIMs, for example, may be used to facilitate the placement of various construction elements and fixtures at respective construction points during the interior construction phase of a new building or during the renovation phase of an older building. The construction points may be projected at the site using various automated tools, for example, a robotic total station, a measurement tool, a power tool, a drill robot, a projector, etc.

In order to ensure that the construction elements and fixtures are correctly installed by a construction worker, the two-dimensional position of a projector, for instance, used to specify the construction points based on a BIM is determined so that the layout image or blueprint image corresponding to the BIM may be correctly and accurately projected based on the position of the projector relative to the projecting surface. Practically, however, there is a need to accurately determine not only the two-dimensional position of the tool (the projector in this instance), but also to determine its three-dimensional position and the orientation of the tool in order ensure a higher level of construction-related accuracy.

SUMMARY OF THE INVENTION

In accordance with one or more aspects and/or principles of the present invention, the invention is directed to a system and method for determining a position and orientation (e.g., pose) of a rigid body, such as a position enabled projector, a measurement rod or surveying rod, a power tool, a drill robot, etc., in a given space. The position of the rigid body is specified by a set of three coordinates and the orientation is specified by a set of three angles. As such, based on these six values, the position and orientation of the rigid body can be determined.

Other objects, advantages and novel features of the present invention will become apparent from the following detailed description of one or more preferred embodiments when considered in conjunction with the accompanying drawings.

DETAILED DESCRIPTION OF THE DRAWINGS

The present invention is directed to determining the position and orientation of a rigid body in space based on six values. For example, three of the six values are coordinate values (e.g., Cartesian coordinates) that correspond to the position of the rigid body and the other three values are angle values (e.g., Euler angles) that correspond to the orientation of the rigid body. The determined position and orientation data may be provided to and used by the rigid body in order to accurately perform a particular task (e.g., construction task) while accounting for the position and orientation of the rigid body.

In one aspect of the present invention, a master device (e.g., a robotic total station with tracking capabilities) may be configured to track a rigid body, which may be a tool that can interact with the master device, such as a position enabled projector (PEP), a measurement or surveying rod, a power tool, a drill robot, etc. Based on the tracking, the master device measures two or more angles (e.g., azimuth angle, elevation angle) and the distance from the master device to the rigid body. Moreover, one or more sensors may be arranged on the rigid body. For instance, a first sensor that can measure incidence angle(s) of the tracking light from the master device may be stiffly arranged on and/or connected to the rigid body. In another instance, a second sensor that can measure inclination angle(s) of the rigid body itself may also be stiffly arranged on and/or connected to the rigid body. In at least that regard, the position and orientation (e.g., pose) of the rigid body may be determined based on the two or more angles measured by the master device, the distance from the master device to the rigid body, the incidence angle(s), and the inclination angle(s) exhibited by the rigid body.

There are many different applications where there is a need to know the position and orientation (pose) of the rigid body. In one example, when the rigid body is a position enabled projector (PEP), the image being projected from the PEP must be projected on a work surface with correct position and/or correct scale. In another example, when the rigid body is a rod (such as a measurement rod or a surveying rod), the rod can be held in any orientation. In yet another example, when the rigid body is a power tool, a construction worker may need to know the specific position/orientation of the power tool to perform the construction task at hand. In a further example, when the rigid body is a robot, the user may need to know the exact pose of the robot in a particular task site, such as a room.

The invention described herein may be implemented on and executed by one or more computing devices. For instance, the master device and the rigid body may both have computing capabilities, by way of example, one or more processors, central processing units (CPUs), etc. As will be further described below, the computing associated with determining the position and orientation of the rigid body may be executed by computing hardware in the rigid body and/or a separate portable computing device, such as a laptop, tablet computer, or any other suitable type of mobile computing device.

Figure 1:
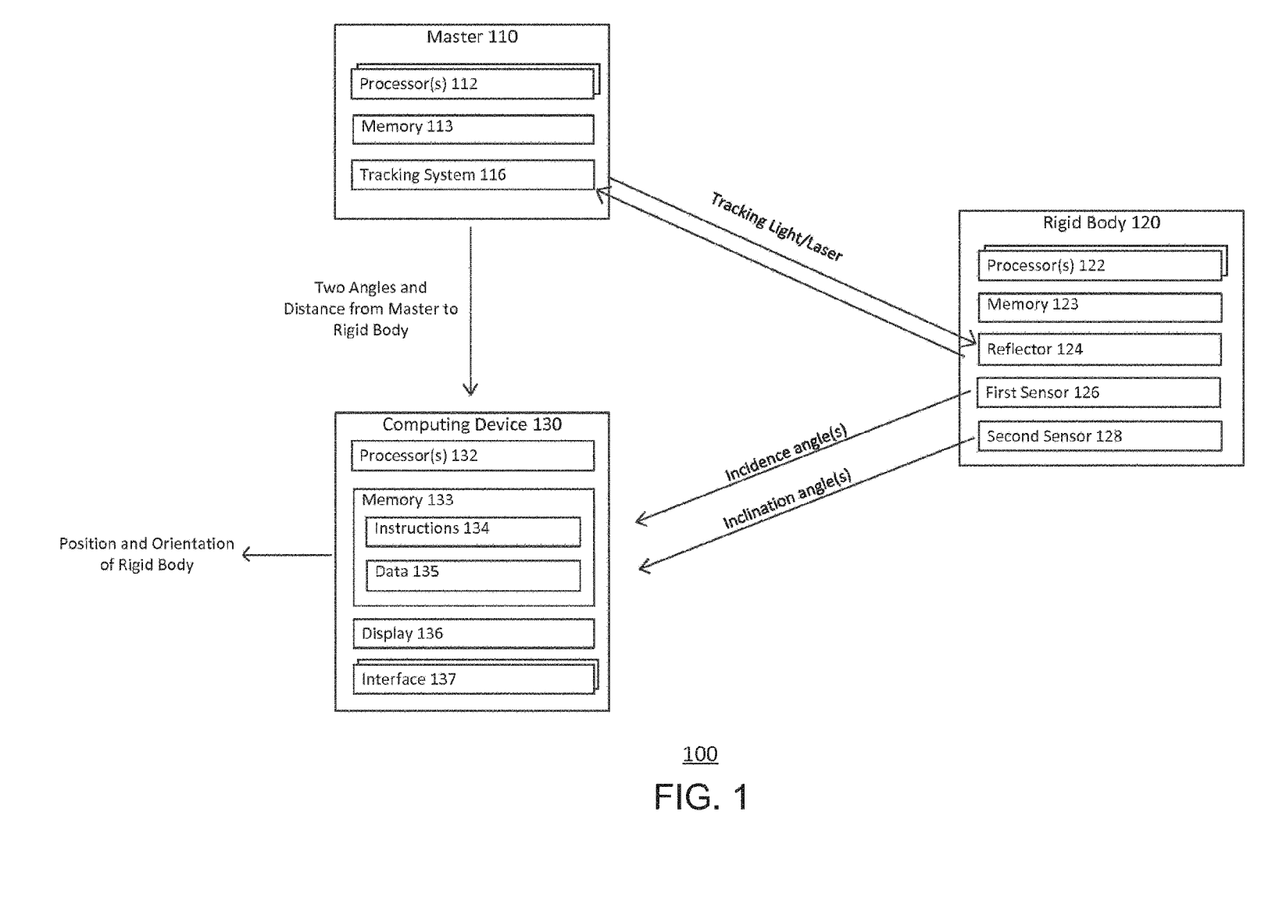
FIG. 1 illustrates a system in accordance with one or more principles of the present invention.

FIG. 1 illustrates an example of a system 100 in accordance with one or more aspects of the present invention. As shown, the system 100 includes a master device 110, a rigid body 120, and a computing device 130, which, for instance, may ultimately determine the position and orientation of the rigid body 120.

Master device 110 may be a total station, such as an off-the-shelf robotic total station with tracking capabilities. The total station may be a surveying instrument that integrates at least an electric theodolite, which uses a moveable telescope to measure angles in both horizontal and vertical planes, and an electric distance meter. A robotic total station allows an operator to control the instrument from a particular distance using a remote control. As illustrated in FIG. 1, the master device 110 includes at least one or more processors 112, memory 113, and a tracking system 116. The processor 112 may instruct the components of the master device 110 to perform various tasks based on the processing of information and/or data that may have been previously stored or have been received, such as instructions and/or data stored in memory 113. The processor 112 may be a standard processor, such as a central processing unit (CPU), a graphics processor, or may be a dedicated processor, such as an application-specific integrated circuit (ASIC) or a field programmable gate array (FPGA). The tracking system 116 of the master device 110 may be configured to emit a tracking light or laser, for example, toward a target, such as reflector 124 of the rigid body 120.

As described above, the rigid body 120 may be any suitable type of instrument that may be used during a construction project, such as a projector (e.g., a position enabled projector), a rod (e.g., a measurement rod, a surveying rod), a power tool, and a robot (e.g., a drill robot). Similar to the master device 110, the rigid body 120 may also include one or more processors 122 and memory 123. In addition, the rigid body 120 may include a reflector 124, a first sensor 126, and a second sensor 128.

Processor 122, which is similar to the processor 112, may be standard processor, a dedicated processor, a graphics processor, or any other suitable type of processing circuitry. The rigid body 120 may also include a graphics processor. Memory 123, which is also similar to memory 113, stores information and/or data that can be accessed by processor 122, including instructions executable by the processor 122 and data (which can be retrieved, manipulated and/or stored by the processor 122 in accordance with the set of instructions or other sets of executable instructions).

Reflector 124 may be one or more optical reflectors arranged on the rigid body 120 in order to, for example, simplify the tracking process for the master device 110. FIG. 1 shows a tracking light or laser beam emitted from and reflected back to the master device 110 via the reflector 124. In one aspect, the reflector 124 may be a 360-degree prism that can reflect incoming light or laser beam from any suitable orientation and can be rotated on an axis. In another aspect, the reflector 124 may be an actuated prism that is configured to be continuously aligned in the direction of the master device 110. The actuation may be performed in one dimension, but the field of view may be created in a second dimension by way of one or more prisms along the second dimension. Alternatively, the actuation may be performed in two dimensions, for example, with a gimbal. In yet other aspects, the reflector 124 may be a plastic-based reflector or any type of visual mark that can be tracked by a camera.

First sensor 126 may include one or more image sensors, which can be analog and/or digital types, such as a camera, radar, thermal, sonar, etc. By way of example, at least two cameras with wide field-of-view lenses may be stiffly arranged on the rigid body to measure incidence angle(s) of the tracking light/laser from the master device 110. Additionally, the incidence angles may be derived from the position the master device 110 appears in the images from the image sensors.

Second sensor 128 may be any type of gravitation or inclination sensor configured to measure inclination angles in one or more dimensions, such as an inclinometer (e.g., fluid or micro-electro-mechanical-system based), accelerometer (e.g., micro-electro-mechanical-system based), etc. While FIG. 1 shows a first sensor 126 and a second sensor 128, it may be understood that additional sensors may optionally be used and integrated in the rigid body 120, such as a third sensor (e.g., a multi-dimensional gyroscope) that may measure rate of change of rotation.

In order to achieve high accuracy of measurements and readings, the various components of the rigid body 120 (e.g., reflector 124, first sensor 126, second sensor 128, third sensor) may be stiffly integrated such that the relative positions of the components do not change with respect to each other (whether by way of environmental changes or mechanical impact). As such, the relative positions of these components, for instance, may be known and measured during a calibration step during or after production of the rigid body.

As shown in FIG. 1, at least the one or more incidence angles derived from the first sensor 126 and the one or more inclination angles derived from the second sensor 128 (along the two angle and distance measurements produced by the master device 110) may be used by the computing device 130 to calculate the position and orientation (such as the pose) of the rigid body 120. The computing device 130 may be a mobile computer, such as a tablet computer, laptop, etc. and includes one or more processors 132, memory 133 (which contains instructions 134 and data 135), a display 136, and interface 137. The instructions 134 may be software that can be implemented by the processor 132. Data 115 may include various types of information, such as the angles and distance measurements from the master device 110 and the incidence and inclination angles from the first sensor 126 and second sensor 128, respectively. The display 136 may be any type of device capable of outputting and/or communicating data to a user, such as a liquid-crystal display ("LCD") screen, a plasma screen, etc. Interface 137 may be a device, port, or a connection that allows a user to communicate with the computing device 130, including but not limited to a touch-sensitive screen, microphone, camera, and may also include one or more input/output ports, such as a universal serial bus (USB) drive, various card readers, etc.

Although the calculation and/or determination of the position and orientation of the rigid body is carried out separately by the computing device 130 in FIG. 1, it may be understood that the calculation and/or determination may be performed by the rigid body 120 itself, or alternatively, by other computing hardware integrated into the rigid body 120 that are similar to the components found in computing device 130.

In accordance with aspects of the present invention, the position of the rigid body relative to the master device and the orientation of the rigid body relative to the master device may be determined using a system of equations based on parameters that are known (e.g., vector from rigid body to reflector, rotation matrix from second sensor to rigid body, vector from first sensor to rigid body, rotation matrix from first sensor to rigid body, gravity vector of the master device) as well as parameters that are unknown (but may not be of immediate interest, e.g., distance between the first sensor and the master device). In at least that regard, the aforementioned system of equations is as follows:

$$t_A^M = -R_A^M v_M + p_A \quad (1)$$

$$g_I = R_I^A R_A^M g_M \quad (2)$$

$$k\hat{u}_0 = t_0^A + R_0^A p_A - R_0^A R_A^M v_M \quad (3)$$

The above symbols, variables, and/or parameters are as follows:

General Symbols:

| | |
|---|---|
| A | assembly (e.g., rigid body) |
| 0 | first sensor (e.g., image sensor) |
| G | second sensor (e.g., gravitation sensor, inclination sensor) |
| M | master device |

Unknown Position and/or Orientation of Rigid Body:

| | |
|---|---|
| $t_A^M$ | position of the rigid body relative to the master device |
| $R_A^M$ | orientation of the rigid body relative to the master device |

Nuisance Parameter (e.g., Unknown, but not of Immediate Interest):

| | |
|---|---|
| k | distance between the first sensor and the master device |
| $\hat{u}_0$ | unit vector from the first sensor to the master device |
| $v_M$ | vector from the master device to the reflector |
| $g_I$ | gravity vector measured by the second sensor |

Measurements:

| | |
|---|---|
| k | distance between the first sensor and the master device |

Known System Parameters:

| | |
|---|---|
| $p_A$ | vector from the rigid body to the reflector |
| $R_I^A$ | rotation matrix from the second sensor to the rigid body |
| $t_0^A$ | vector from the first sensor to the rigid body |
| $R_0^A$ | rotation matrix from the first sensor to the rigid body |
| $g_M$ | gravity vector of the master device |

The above-described system of equations may be calculated by applying any suitable type of standard solver, such as Newton's method. Moreover, as described above, the calculations are performed and/or executed by one or more processors, such as the one or more processors 132 of the computing device 130.

Figure 2:
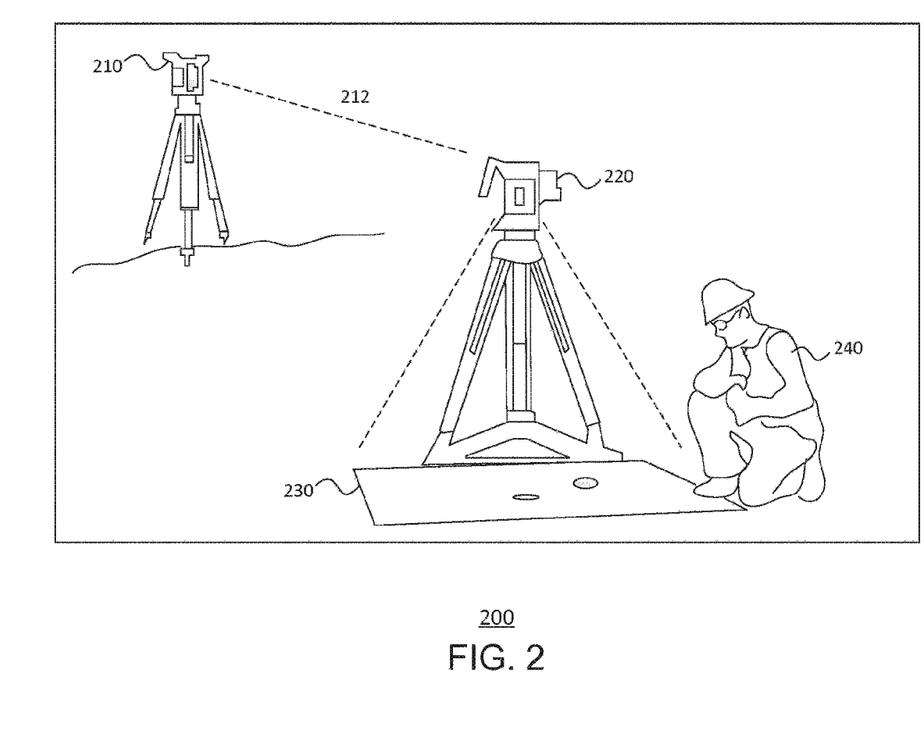
FIG. 2 illustrates a system having a total station and a projector in accordance with one or more principles of the present invention.
Figure 3:
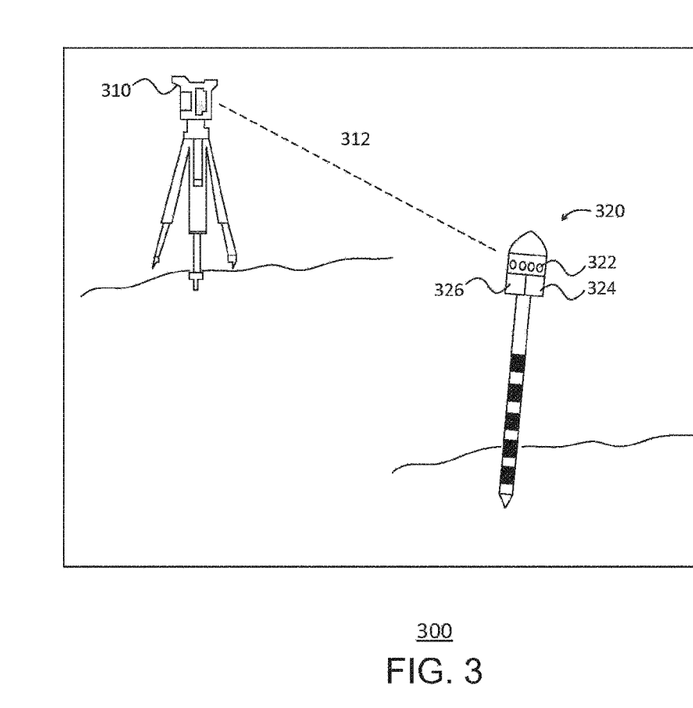
FIG. 3 illustrates a system having a total station and a measurement rod in accordance with one or more principles of the present invention.

Determining and knowing the position/orientation of a rigid body has numerous uses and applications. In one example, the invention may be implemented when a projector is used in conjunction with a total station, as illustrated in FIG. 2, which is further described in U.S. application Ser. No. 15/639,308 filed on Jun. 30, 2017, the content of which is incorporated herein by reference in its entirety. In another example, the invention may be implemented when a surveying rod is used with a total station, as shown in FIG. 3. In yet another example, the invention may also be implemented when a power tool is used with a master device. And in a further example, the invention may be implemented when a robot (e.g., a drill robot) is used with a master device. In all of the aforementioned examples, the specific position and orientation measurements of the rigid bodies allow the respective users to utilize the tools with high precision and accuracy, in particular, when BIMs are used.

FIG. 2 illustrates a system 200 that includes a master device (a robotic total station 210) and a rigid body (a projector 220) in accordance with aspects of the present invention. For instance, the projector 220 may be a position enabled projector and arranged on a tripod. And although not shown, the projector 220 may include at least a reflector, an image sensor, and an inclination sensor, as discussed above. As illustrated in FIG. 2, the robotic total station 210 emits a tracking light or laser 212 and can be configured to track the projector 220. By way of example, the projector 220 may be configured to project an image onto a projecting surface, such as the ground, to display a blueprint 230 associated with a particular construction task that a construction worker 240 can carry out or perform. The blueprint 230 may specify one or more positions on the ground and/or provide instructions to the worker 240 to drill/install construction elements at those specified positions.

The tripod of the projector 220, however, may not necessarily be level. This may be caused by the unevenness of the ground and/or the unevenness of the working environment, and thus, can cause scaling inaccuracies or other types of inaccuracies in the projected blueprint 230. But a computing device, whether a separate device or the computing hardware in the projector 220, may determine the position and/or orientation of the projector 220 relative to the total station 210, as described above. Based on the determined position and orientation, the projector 220 can adjust, calibrate, and/or correct the projection of the blueprint 230 so that it is accurately and correctly displayed on the ground, as illustrated in FIG. 2.

FIG. 3 illustrates a system 300 that includes a master device (a robotic total station 310) and a rigid body (a measurement rod 320) in accordance with aspects of the present invention. For example, the measurement rod 320 may include a 360-degree prism reflector 322, an inclination or gravitation sensor 324, and an image sensor 326. Similar to FIG. 2, FIG. 3 also shows that the robotic total station 310 emits a tracking light or laser beam 312 toward the measurement rod 320. Conventionally, a measurement rod or surveying rod is required to be manually held or adjusted to be strictly vertical, which is done typically with an optical level. If the measurement rod or surveying rod is not held strictly in a vertical manner, measurement errors may occur. Integrating the present invention, however, the measurement rod 320 may be used in any orientation.

As shown in FIG. 3, the measurement rod 320 is tilted as a result of the unevenness of the ground. But by determining the position and orientation of the measurement rod 320 (e.g., from the tip of the measurement rod) relative to the robotic total station 310, measurements may be adjusted, calibrated, and/or corrected accordingly. Although not shown, a separate computing device may be used to calculate the position and orientation of the measurement rod 320, or alternatively, the computing device of the measurement rod itself can perform those calculations.

In other examples, similar systems illustrated in FIGS. 2 and 3 may be implemented when the rigid body is a power tool or a robot. The power tool, for instance, may be a power drill that needs to be positioned with precision before use. By determining the position and orientation of the power drill, it may be exactly positioned to where it has to be used. Moreover, where the power tool was last used (e.g., position) may be documented. In the example of the robot, the robot may be a drilling robot that can perform precise drilling tasks at a construction site. The present invention may enable the robot to obtain the position and orientation of itself or parts of itself so that the robot can position/orient itself correctly to perform a construction task, such as drilling.

In yet other examples in accordance with the present invention, it can be determined whether the rigid body is at rest or in motion. Depending on the state of the rigid body, one of at least two operations may be performed. If the rigid body is in a dynamic state (e.g., moving laterally or rotationally), additional sensors that can measure rate of change in movement, such as accelerometers, gyroscopes, optical flow sensors, etc., may be implemented, and further, periodic updates from all sensors may be requested and received. This will ensure high measurement accuracy. If the rigid body is static (e.g., at rest), then all components are assumed to be stationary (or in some cases, quasi-stationary) and the measurement of the rate of change of movement of the rigid body and the periodic updates from all sensors may not be needed.

Figure 4:
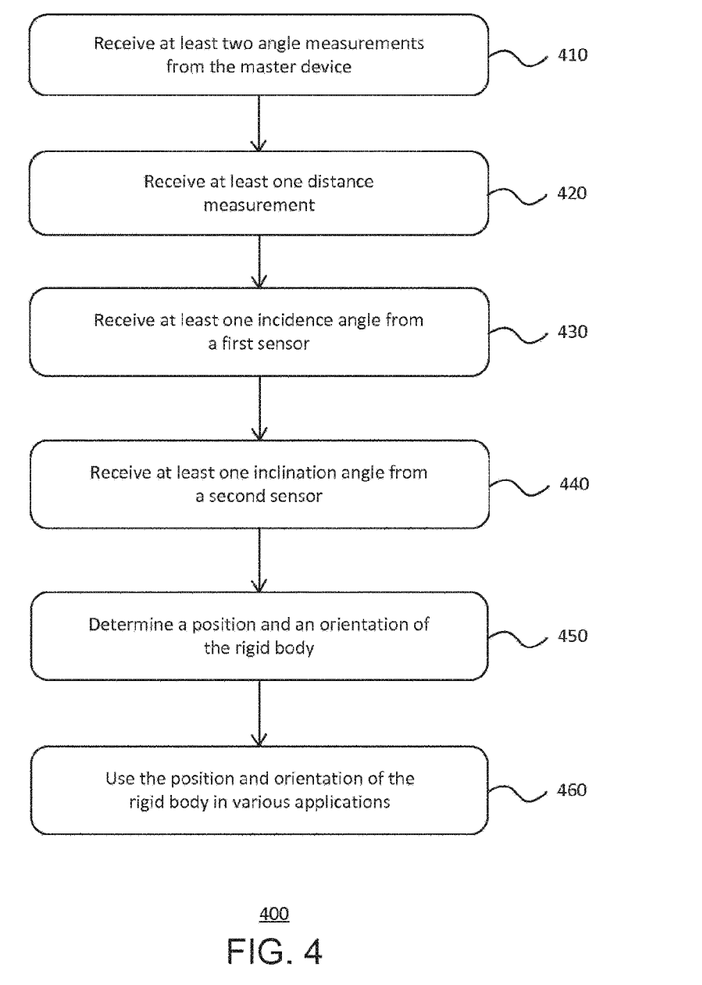
FIG. 4 illustrates a flow diagram in accordance with one or more principles of the present invention.

FIG. 4 illustrates a flow diagram 400 in accordance with one or more aspects of the present invention. It may be understood that the steps of the flow diagram 400 may be performed or executed by one or more processors of a computing device, whether it may be, by way of the example system 100 of FIG. 1, the computing device 130 or by the one or more processors 120 of the rigid body 120. Moreover, it may be understood that order of the steps in FIG. 4 may not be limited thereto, but may be arranged in any suitable order.

In step 410, the rigid body may receive at least two angle measurements from the master device. As described above, these two angle measurements may be azimuth and elevation angles of the rigid body, as measured from the master device. Similarly, in step 420, the rigid body may receive at least one distance measurement from the master device, where the distance measurement is the distance between the master device and the rigid body.

In step 430, a first sensor (such as at least two cameras with wide field-of-view lenses) may be used to measure at least one incidence angle based on a tracking light emitted from the master device. The incidence angle measurement(s) may be sent to and received by the one or more processors of the rigid body for further processing in this step.

In step 440, a second sensor (such as a Micro-Electro-Mechanical-System (MEMS) inclination sensor or inclinometer) may be used to measure at least one inclination angle (e.g., direction of gravity) of the rigid body. The inclination angle measurement(s) may be sent to and received by the one or more processors of the rigid body for further processing. Both the first sensor and the second sensor described in steps 430 and 440 may be stiffly connected to and/or arranged on the rigid body itself so that the positions of the sensors (first sensor and second sensor) relative to each other do no change. These positions, as described above, may be preconfigured and calibrated during the assembly of the rigid body.

In step 450, using the two angles and distance measurement(s) from the master device, the incidence angle(s) from the first sensor, and the inclination angle(s) from the second sensor, the rigid body may determine position and orientation (e.g., pose) values. As described above, the position values may be represented by a set of three coordinates (e.g., Cartesian coordinates) and the orientation values may be represented by a set of three angles (e.g., Euler angles).

In step 460, the determined position and orientation of the rigid body may be used in various applications. When the rigid body is a positioned enabled projector, an image may be projected with correct and accurate position and scale based on the position and/or orientation of the projector. When the rigid body is a measurement rod for a total station, knowing the position and/or orientation of the measurement rod may allow an operator to hold the measurement rod in any orientation during its use. When the rigid body is a power tool, knowing the position and/or orientation of the power tool may allow to exactly position the power tool to where it has to be used or allow documentation of where the power tool was previously used. When the rigid body is a robot, knowing the position and/or orientation of the robot may allow the operator to correctly operate the robot, particularly if the robot is configured to perform a specific construction task, such as drilling via a drilling arm and a drill. In at least that regard, the three coordinates representing the position and the three angles representing the orientation may ultimately be sent to another computing device for further processing, such as the computing device in the rigid body itself, so that these values may be used to increase accuracy and productivity during a construction task. Additionally, in other examples, the three coordinate values and three angle values may be displayed on a mobile computing device, e.g., a handheld controller, for displaying the values to a user.

Numerous advantageous of the present invention, include but are not limited to, enhancing the accuracy and effectiveness of operating a rigid body based on at least six different values or six-dimensions related to the position and orientation of the rigid body. In at least that regard, based on the determined position and orientation values, operation of the rigid body may be adjusted or calibrated accordingly, for example, better projecting an image from a projector based on its position and orientation. The present invention allows at least the cost of tools to decrease while increasing the accuracy and robustness of the tools.

The foregoing invention has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure uses terminology and acronyms that may not be familiar to the layperson, those skilled in the art will be familiar with the terminology and acronyms used herein.

What is claimed is:

1. A system for measuring position and orientation of a rigid body, comprising:
   a master device, wherein the master device is a robotic total station having a tracking system configured to emit a tracking light and to track the rigid body;
   a first sensor configured to measure at least one incidence angle of the tracking light from the master device, wherein the first sensor is stiffly arranged on and/or connected to the rigid body;
   a second sensor configured to measure at least one inclination angle of the rigid body, wherein the second sensor is stiffly arranged on and/or connected to the rigid body; and
   at least one processor for executing stored instructions to:
      receive at least two angle measurements from the master device, receive at least one distance measurement from the master device, wherein the distance measurement is a distance from the master device to the rigid body, receive the at least one incidence angle from the first sensor, receive the at least one inclination angle from the second sensor, and determine a position of the rigid body and an orientation of the rigid body based at least in part on the at least two angle measurements, the at least one distance measurement, the at least one incidence angle, and the at least one inclination angle.

2. The system of claim 1, wherein the rigid body is a position enabled projector and wherein a two-dimensional image is projectable by the rigid body on a surface with correct position and correct scale based on one or more of: (i) the determined position and (ii) the determined orientation of the position enabled projector.

3. The system of claim 1, wherein the rigid body is a measurement rod for a total station and wherein the measurement rod is held in any orientation during operation based on one or more of: (i) the determined position and (ii) the determined orientation of the measurement rod.

4. The system of claim 1, wherein the rigid body is a power tool and wherein the power tool is positionable for appropriate operation based on one or more of: (i) the determined position and (ii) the determined orientation of the power tool.

5. The system of claim 1, wherein the rigid body is a robot and wherein the robot is positionable for appropriate operation of one or more components of the robot and a location of the robot is known based on one or more of: (i) the determined position and (ii) the determined orientation of the robot, wherein the one or more components of the robot includes a drill.

6. The system of claim 1, wherein the at least two angle measurements from the master device include an azimuth angle and an elevation angle relative to the rigid body.

7. The system of claim 1 further comprising a reflector and wherein the first sensor, the second sensor, and the reflector are stiffly arranged on and/or connected to the rigid body such that positions of the first sensor, the second sensor, and the reflector are known and unchanged relative to each other.

8. The system of claim 7, wherein the reflector is a 360-degrees prism.

9. The system of claim 1, wherein the first sensor includes one or more image sensors.

10. The system of claim 9, wherein the one or more image sensors is a camera with wide field-of-view lenses configured to measure the at least one incidence angle of the tracking light.

11. The system of claim 1, wherein the second sensor includes one or more of: (i) a fluid-based inclinometer, (ii) a Micro-Electro-Mechanical System (MEMS) inclinometer, and (iii) an accelerometer.

12. The system of claim 1, further comprising a third sensor configured to measure a rate of change of rotation of the rigid body.

13. The system of claim 12, wherein the third sensor is a gyroscope.

14. The system of claim 1, wherein the at least one processor is further configured to:

determine whether the rigid body is in a static state or a dynamic state, and perform an update on a rate of sensor measurements based on the determination.

15. The system of claim 1, wherein the position of the rigid body is represented by a set of three coordinates and wherein the set of three coordinates are Cartesian coordinates.

16. The system of claim 1, wherein the orientation of the rigid body is represented by a set of three angles and wherein the set of three angles are Euler angles.

17. A method for measuring position and orientation of a rigid body, comprising the steps of:

receiving, by at least one processor, at least two angle measurements from a master device, wherein the master device is a robotic total station having a tracking system that emits a tracking light and tracks the rigid body;

receiving, by the at least one processor, at least one distance measurement from the master device, wherein the distance measurement is a distance from the master device to the rigid body;

receiving, by the at least one processor, at least one incidence angle of the tracking light of the master device from a first sensor, wherein the first sensor is stiffly arranged on and/or connected to the rigid body;

receiving, by the at least one processor, at least one inclination angle of the rigid body from a second sensor, wherein the second sensor is stiffly arranged on and/or connected to the rigid body;

determining a position of the rigid body and an orientation of the rigid body based at least in part on the at least two angle measurements, the at least one distance measurement, the at least one incidence angle, and the at least one inclination angle; and using, by the at least one processor, the determined position of the rigid body and the determined orientation of the rigid body in a construction task.

18. The method of claim 17, wherein the rigid body is a position enabled projector, a measurement rod for a total station, a power tool, or a robot.

19. A non-transitory computer-readable medium comprising a set of executable instructions, the set of executable instructions when executed by at least one processor causes the at least one processor to perform a method for measuring position and orientation of a rigid body, the method comprising the steps of:

receiving, from a master device, at least two angle measurements, wherein the master device is a robotic total station having a tracking system that emits a tracking light and tracks the rigid body;

receiving, from the master device, at least one distance measurement, wherein the distance measurement is a distance from the master device to the rigid body;

receiving, from a first sensor, at least one incidence angle of the tracking light from the master device, wherein the first sensor is stiffly arranged on and/or connected to the rigid body;

receiving, from a second sensor, at least one inclination angle of the rigid body, wherein the second sensor is stiffly arranged on and/or connected to the rigid body; and determining a position of the rigid body and an orientation of the rigid body based at least in part on the at least two angle measurements, the at least one distance measurement, the at least one incidence angle, and the at least one inclination angle.

20. A computer program product comprising a set of executable instructions, the set of executable instructions when executed by at least one processor causes the at least one processor to perform the method for measuring position and orientation of a rigid body according to claim 17.

* * * * *